Figure 1:
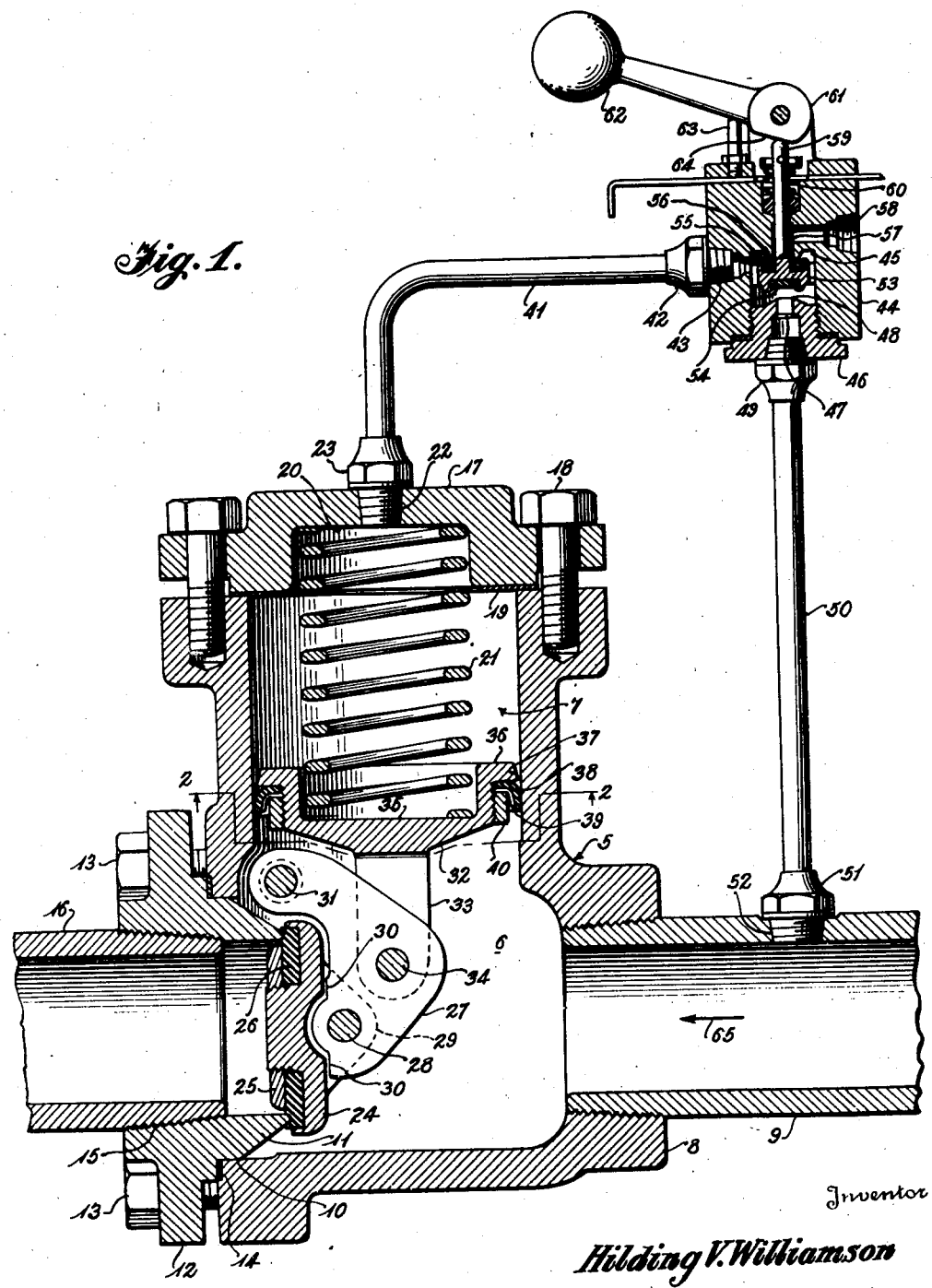

July 13, 1948.   H. V. WILLIAMSON   2,445,163
FLUID PRESSURE OPERATED VALVE

Filed Sept. 28, 1942    2 Sheets-Sheet 1

Inventor
Hilding V. Williamson
By L. Donald Myers
Attorney

July 13, 1948.  H. V. WILLIAMSON  2,445,163
FLUID PRESSURE OPERATED VALVE
Filed Sept. 28, 1942  2 Sheets-Sheet 2
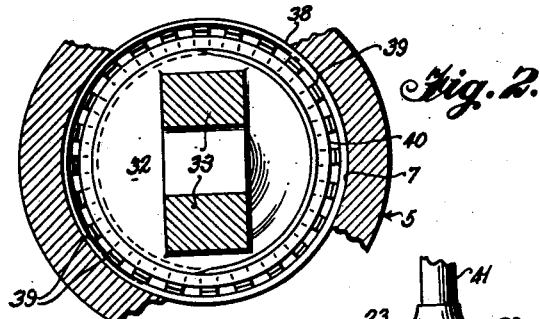
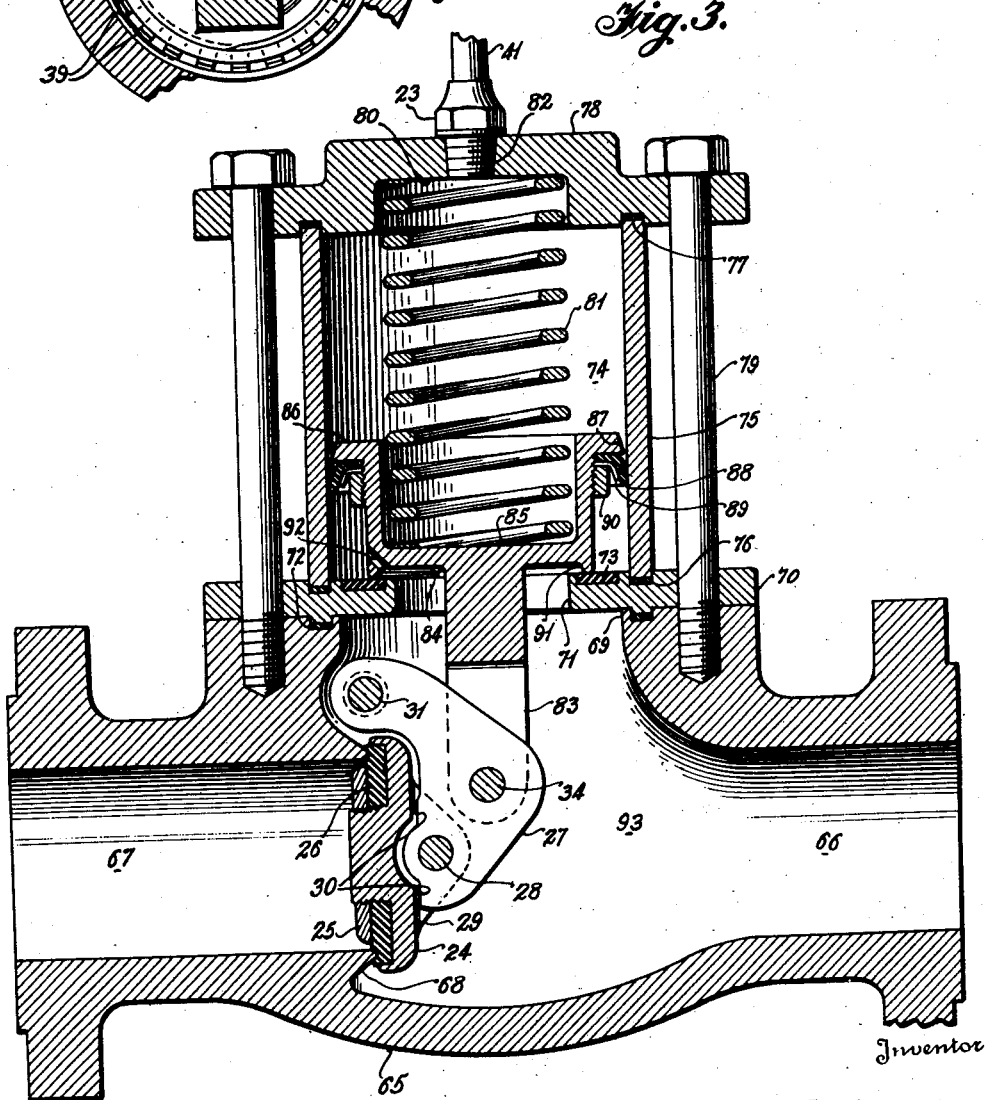
Inventor
Hilding V. Williamson
By L. Donald Myers
Attorney Patented July 13, 1948

2,445,163

UNITED STATES PATENT OFFICE 2,445,163

FLUID PRESSURE OPERATED VALVE

Hilding V. Williamson, Chicago, Ill., assignor, by mesne assignments, to Cardox Corporation, Chicago, Ill., a corporation of Illinois Application September 28, 1942, Serial No. 460,009

16 Claims. (Cl. 137—139)

This invention relates to new and useful improvements in fluid pressure operated valves and deals more particularly with valves which are adapted for controlling the flow of liquid carbon dioxide used for extinguishing fires.

The primary object of this invention is to provide valves which are particularly adapted for use in controlling the flow of liquid carbon dioxide employed as the extinguishing medium in fire protection systems and apparatus.

A further important object of the invention is the provision of values of the above mentioned type which may be opened and closed and held in both of such positions by the pressure of the controlled liquid carbon dioxide.

Still another principal object of the invention is the provision of a valve which when open provides a straight through flow path that produces no greater pressure drop than that of an ordinary pipe section of the same dimensions.

Another object of the invention is to provide a valve which is opened against the pressure of the fluid being controlled and as a result of a differential pressure condition being intentionally created within the valve casing.

A still further object of the invention is the provision of a valve which is opened and closed by the pressure of the fluid being controlled and which will not be caused to open unintentionally in response to a sudden surge, or build up of pressure, in the upstream side of the valve casing.

Other objects and advantages of the invention will be apparent during the course of the following description.

In the accompanying drawings forming a part of this specification and in which like numerals are employed to designate like parts throughout the same, Figure 1 is a vertical sectional view of one form of fluid pressure operated valve structure embodying this invention, Figure 2 is a detail sectional view taken on line 2—2 of Fig. 1, and Figure 3 is a similar view to Fig. 1 but illustrates a slightly modified form of valve structure.

In the drawings, wherein for the purpose of illustration are shown the preferred embodiments of this invention, and first particularly referring to Figs. 1 and 2, the reference character 5 designates the main body of the valve casing. This main body is of hollow construction to provide an inlet pressure chamber 6 with a power cylinder 7 overlying and in fully open communication therewith. The inlet side of the main body 5 is provided with a suitable connection 8 for the supply pipe 9 which extends to a suitable source of supply of the fluid, the flow of which is controlled by the valve structure.

The outlet side of the main valve body 5 is provided with the opening 10 that is adapted to receive the valve seat 11 that is formed with a flange 12 for receiving the securing studs 13. A gasket 14 is provided for sealing between the flanged valve seat and the margin of the valve body opening 10. The flanged valve seat is internally threaded at 15 for connection with the outlet pipe 16 that extends to or toward the point or points of use of the controlled fluid.

The open upper end of the power cylinder 7 is closed by means of the flanged cover plate 17 which is secured to the body 5 of the valve casing by means of the studs 18. A packing gasket 19 is interposed between the cover plate and the upper end of the main body 5 of the valve casing to prevent leakage between these two elements. This gasket extends inwardly of the wall of the cylinder 7 for a purpose to be explained later. The cover plate 17 is recessed at 20 to provide a seat for and part of a nesting space for the coil spring 21. The recessed portion of the cover 17 is tapped at 22 for threaded connection with a coupling 23.

A valve disc 24 has secured thereto by the retainer 25 a valve seating washer 26 which may be made of any suitable material, such as a synthetic rubber that will withstand low temperatures. A valve disc carrier 27, which takes the form of a bell crank lever, is pivotally connected to the back of the valve disc by means of the pin 28 which passes through ears 29 formed on the back of the disc 24. The end portion of the carrier 27 which is pivotally connected to the disc 24 is provided with shoulders 30 which oppose the rear face of the valve disc. These shoulders 30 are spaced a suitable distance from the rear face of the valve disc 24 to allow for a limited amount of pivotal movement between the valve disc and its carrier 27. This clearance allows for just sufficient action of the disc 24 to assure an even distribution of pressure on the valve seat 11 by the top and bottom portions of the disc 24. This slight pivotal movement of the disc relative to its carrier also provides uniform seating in case the valve washer 26 becomes permanently compressed.

The remaining end of the bell crank lever type of valve disc carrier 27 is pivotally connected to the valve casing body 5 by means of the hinge pin 31. This hinge pin is so positioned that its axis lies substantially in the plane of the seating edge of the valve seat 11. This positioning of the hinge pin 31 causes the valve disc pin 28 to be displaced laterally relative to the plane of the seating edge of the valve seat 11 and the axis of the hinge pin 31.

A power piston 32 is positioned in the power cylinder 7 and is provided with a bifurcated piston rod 33 that is pivotally connected to the intermediate portion of the bell crank lever valve disc carrier 27 by means of the piston pin 34. By inspecting Fig. 1, it will be seen that the piston pin is spaced a substantial distance from the hinge pin 31 and lies laterally outwardly of the valve disc pin 28 to provide a substantial mechanical advantage or leverage action for the power piston 32 when said piston is called upon to actuate the valve disc carrier lever 27.

The power piston 32 is substantially cup shaped to provide the pocket or recess 35 for receiving the lower end of the spring 21. This pocket 35 cooperates with the pocket or recess 20 formed in the cover plate 17 for providing a nesting space for the coil spring 21 when the power piston 32 is moved upwardly through the power cylinder 7. The cupped body of the power piston 32 is provided with a flange 36 at its upper edge. This flange is tapered or beveled at 37 to permit the power piston to partake of a tilting motion within the power cylinder 7 without binding. This tilting motion is made necessary by the fact that no lost motion or play is allowed between the piston pin 34 and either the bifurcated piston rod 33 or the valve disc carrier 27. The tilting motion of the power piston 32, of course, will be caused by movement of the piston pin 34 through an arcuate path that has the axis of the hinge pin 31 as its center. If a lost motion connection were provided between the valve disc carrier 27 and the bifurcated piston rod 33, a suitable guide or race would have to be provided to hold the power piston 32 in a true position during its up and down movements through the power cylinder 7.

Figs. 1 and 2 disclose a cup-leather 38 for packing between the power piston 32 and the wall of the power cylinder 7. Because this cup-leather 38 constitutes the main bearing member for the power piston 32 relative to the power cylinder 37, a suitable number of spring steel strips are employed for backing up the cup-leather. These strips 39 and the cup-leather 38 are clamped against the flange 36 of the power piston by the retaining ring 40 which is threadedly mounted on the cupped body portion of the power piston 32.

The previously referred to coupling 23 has suitably connected thereto a tube 41 which has its outer end suitably connected to a second coupling 42 that is threaded in a tapped hole 43 formed in the pilot valve body 44. The tapped hole 43 is in open communication with the valve chamber 45 formed in the body 44. This chamber 45 is closed at one end by the cap 46 which is formed with a small orifice or port 47 that is surrounded by a valve seat 48 on the chamber side of the cap. A coupling 49 is suitably threadedly connected to the cap 46 and has joined thereto a tube 50 which is suitably connected to the coupling 51 threaded into a suitable tapped hole 52 formed in the inlet or fluid supply pipe 9 upstream of the valve.

A suitable valve disc 53 is located in the valve chamber 45 of the pilot valve body 44. This disc carries a seating member 54 which is adapted to cooperate with the valve seat 48 of the cap 46. A second seating member 55 is carried by the valve disc 53 and is adapted to cooperate with a valve seat 56 that surrounds the inner end of a duct 57 that is formed in the pilot valve body 44. This duct 57 is tapped at its outer end 58 for connection with a suitable tube, or the like, that is open to the atmosphere.

A stem 59 is connected to the valve disc 53. This stem is loaded by the spring 60 so that the valve disc 53 will normally occupy a position where its seating member 55 will engage the valve seat 56 for closing off communication between the chamber 45 of the pilot valve body and the venting duct 57. When the valve disc 53 is in the position illustrated in Fig. 1, the two tubes 41 and 50 are in open communication with each other through the pilot valve body chamber 45. When these tubes 41 and 50 are in open communication with each other any pressure developed in the inlet or supply pipe 9 and the inlet chamber 6 by the controlled fluid will also be developed in the power cylinder 7 above the power piston 32.

A valve stem operating cam 61 is arranged to engage the outer end of the valve stem 59 for moving the valve disc 53 from the position illustrated in Fig. 1 to a position where its seating member 54 will engage the valve seat 48. The valve stem operating cam 61 is actuated by the weighted lever 62 to effect this movement of the valve disc 53. The cam 61 and its lever 62 are held in their normal positions by means of the stop pin 63. When in this position the low portion 64 of the cam is in engagement with the valve stem 59. When the cam 61 is moved in a clockwise direction by its lever 62, the high portion of the cam 61 will depress the valve stem 59 for moving the valve disc 53 downwardly so that its seat engaging member 54 will bear against the valve seat 48 while the seating member 55 will be moved out of engagement with the valve seat 56. When in this abnormal position, the tube 41 and its communicating power cylinder 7 will be vented to the atmosphere through the duct 57 while further flow of fluid from the supply or inlet pipe 9 through the tube 50 will be stopped. It will be appreciated, therefore, that the pilot valve structure functions to cause fluid pressure to be built up in or exhausted from the power cylinder 7 above the power piston 32.

The operation of this fluid pressure valve may be described as follows:

When no fluid to be controlled is present in the inlet or supply pipe 9 the valve disc 24 will occupy its closed position under the pressure of the spring 21. When fluid is present in the pipe 9 and the pilot valve disc 53 is in its normal position, as illustrated in Fig. 1, the same fluid pressure is developed in the inlet pressure chamber 6 and the power cylinder 7 above the power piston 32. Therefore, the pressure will be equalized on both surfaces of the power piston 32. The valve disc 24 will then be held in its closed or seated position by the pressure of the spring 21 and the pressure of the fluid that is applied to the back or upstream surface of the disc 24.

To be opened, the valve disc 24 must move against the direction of flow of the fluid through the valve, which is represented by the arrow 65. This opening or unseating movement of the valve disc 24 is accomplished by actuating the cam 61 to move the valve disc 53 from its normal position into the position where it will prevent flow of fluid through the tube 50 and permit venting of the power cylinder 7 through the tube 41, the chamber 45 of the pilot valve body 44 and the duct 57. This venting of the power cylinder 7 to the atmosphere relieves the upper surface of the power piston 32 of fluid pressure. The power piston then is only loaded from above by the spring 21. The fluid pressure within the inlet chamber 6, however, is still applied to the lower surface of the power piston. The area of this lower or inner surface of the power piston relative to the area of the inner surface of the valve disc 24 is such that substantially a two-to-one pressure ratio is provided in favor of the power piston. This differential fluid pressure applied to the power piston will cause the latter to move upwardly through the power cylinder 7 to effect opening movement of the valve disc 24. This upward movement of the power piston is limited by sealing engagement of its flange 36 with the exposed portion of the packing gasket 19. This sealing engagement of the power piston with the gasket backs up the sealing accomplished by the cup-leather 38, while atmospheric pressure prevails in the power cylinder 7, to prevent any leakage of carbon dioxide into the space formed by the spring receiving recesses 20 and 35. If liquid carbon dioxide were permitted to pass into this vented space, the resulting pressure drop would cause the liquid to flash to a mixture of carbon dioxide snow and vapor. The snow would very likely clog up the passage through the coupling 23 and cause pressure to build up above the power piston which would bring about premature closing of the valve. When the power piston is in this extreme upper position, the valve disc 24 and its associated elements 25 and 26 will be positioned out of the path of flow of the fluid through the main valve body 5 from the inlet pipe 9 to the outlet pipe 16. Therefore, there will be no appreciable pressure drop created within the valve body.

When it is desired to again close or seat the valve disc 24, the pilot valve operating cam 61 is moved into the position illustrated in Fig. 1 so that the spring 60 may cause the valve disc 53 to assume its normal position. When in this normal position fluid from the inlet or supply pipe 9 will flow through the tubes 50 and 41 into the power cylinder 7 for again equalizing the fluid pressure applied to both surfaces of the power piston 32. The spring 21 and the fluid pressure applied to the valve disc 24 will then cause the valve disc to be closed or seated.

In certain types of fire extinguishing systems it is necessary to employ two or more valves in series. With such an arrangement the valve closest to the source of supply of the liquid carbon dioxide fire extinguishing medium functions as a master control valve which normally shuts off the flow of the fluid to the remaining valve or valves. These remaining or secondary valves are known as selector valves and function to control the flow of the extinguishing medium into one or more branch lines that extend to suitable discharge devices.

When such a system is operated to effect discharge of the extinguishing fluid through one branch line to the exclusion of the remaining branch line or branch lines, the first or master control valve is opened along with the selector valve that is associated with the branch line through which the medium is to be discharged. The remaining selector valves which control the flow of the extinguishing medium through hte additional branch lines should remain closed.

It will be appreciated, however, that all of the selector valves are not normally subjected to any fluid pressure but are merely held closed by their springs 21. When the master control valve is opened, the fluid will surge or rush through the inlet pipes 9 of the closed selector valves and pressure will build up more quickly in the inlet pressure chamber than it will in the power cylinder 7. This is due to the fact that the bore or flow path through the tubes 50 and 41 is not as large as the bore of the inlet or supply pipe 9. The excess pressure developed in the inlet chamber 6 relative to the power cylinder 7 will cause the valve to be opened and it will remain open until the pressure is equalized on both sides of the power piston 32.

The valve structure disclosed in Fig. 1, therefore, is best adapted for use as a master control valve in a fire extinguishing system so that it will be constantly supplied with fluid pressure. This vavle then will not be subjected to sudden surges or a rapid build up of pressure within its casing. The valve structure shown in Fig. 3 differs from the valve structure shown in Fig. 1 by having means which will prevent the building up of a differential pressure condition on opposite sides of the power piston as a result of a sudden surge or flow of fluid into the valve casing. The valve of Fig. 3, therefore, is suitable for use as a selector valve in a fire extinguishing system of the type described above. Of course, this valve structure of Fig. 3 may be used also as a master control valve. The distinguishing structural features provided in the valve of Fig. 3 now will be described.

The main body 65 of the valve casing is provided with a flanged inlet end 66 and a flanged outlet end 67. These ends are to be suitably connected with supply and discharge pipes 9 and 16, not shown, the same as the valve of Fig. 1. A suitable valve seat 68 is formed within the body 65 of the valve casing. This seat cooperates with a valve disc and carrier structure which are identical with the elements disclosed and described in connection with the Fig. 1 structure. Therefore, the same reference characters will be applied to these elements.

The main valve casing body 65 is provided with a top opening 69 that is partially closed by a barrier plate 70. This barrier plate is formed with a central opening 71. A suitable packing structure 72 is provided to prevent leakage between this barrier plate 70 and the valve casing body 65. A seating ring 73 is recessed in the upper or outer surface of the barrier plate 70.

A power cylinder 74 is formed by the section of steel tubing 75. The opposite end portions of this cylinder forming tube 75 are seated in packed recesses 76 and 77 formed respectively in the barrier plate 70 and the flanged cover plate 78. The barrier plate 70, power cylinder forming tube 75 and flanged cover plate 78 are maintained in proper assembled relation to each other by the bolts 79.

The cover plate is pocketed or recessed at 80 to accommodate the upper end of the power piston loading spring 81. This pocketed portion of the cover plate is provided with a tapped opening 82 to receive the coupling 23 which is illustrated in Fig. 1 as having connected thereto the tubing 41 that leads to the pilot valve assembly. The same type of pilot valve structure is to be used with this valve structure of Fig 3.

The valve disc carrier 27 has pivotally connected thereto the bifurcated piston rod 83 of the power piston 84. This power piston is cup shaped to provide a pocket or recess 85 for the lower end portion of the loading spring 81. This power piston is provided with a top flange 86 that is tapered or beveled at 87 for the same reason as the power piston of the Fig. 1 valve structure. A packing cup-leather 88 and its series of reinforcing spring steel strips 89 are provided for the power piston and are held in place by the retaining ring 90.

So far the description of the power piston 84 corresponds with the description of the power piston 32 of the Fig. 1 assembly. This power piston 84, however, is provided with an annular seating rib or projection 91 which seats against the ring 73 when the power piston is in its lowermost position, or the position it assumes when the valve disc 24 is closed. A relatively small bleeder port or opening 92 is formed in the power piston 84 to provide a restricted flow path or point of communication between the inlet chamber 93 of the valve body 65 and the annular space that surrounds the body of the power piston; i. e. the space which is defined by the external surface of the body of the power piston, the internal surface of the power cylinder forming tube 75, the associated upper surface of the barrier plate 70 and the packing structure for the power piston.

The mode of operation of this valve now will be described.

With no fluid present within the inlet chamber 93 of the valve casing body 65 and the power cylinder 74, the spring 81 will retain the valve disc 24 in its seated position. The power piston 84 also will have its seating ring 91 in engagement with the seating washer 73 carried by the barrier plate 70.

When this valve structure is subjected to a sudden surge or build up of fluid pressure, the fluid flows into the inlet chamber 93 and is quickly applied to the inner or rear surface of the valve disc 24 and the surface of the power piston 84 which is defined by the annular seating ring or projection 91. Fluid pressure also builds up in the power cylinder 74 as a result of the flow of fluid through the tubing 50 and 41 and the pilot valve structure that is associated therewith. The restricted or small duct 92, formed in the power piston 84 also permits fluid pressure to build up in the annular space that surrounds the body of the power piston. This build up of fluid pressure in this annular space, however, is at a slower rate than the rate of development of fluid pressure within the power cylinder 74. Therefore, a superior fluid pressure will first be created within the power cylinder 74. The fluid pressure applied to the upper surface of the power piston will first exceed the total value of the fluid pressure applied to the lower surface of the power piston. The fluid pressure applied to opposite surfaces of the power piston will become equal when the pressure developed in the annular space surrounding the power piston equals the pressure developed in the power cylinder 74 or the inlet chamber 93 of the valve casing body 65. The sudden surge or build up of fluid pressure within the valve, therefore, will not cause the valve disc 24 to be opened as a result of a more rapid development of pressure within the inlet chamber 93 as compared to the power cylinder 74.

The valve of Fig. 3 will be opened by merely venting the pressure from the power cylinder 74.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. A fluid pressure operated valve, comprising a casing, a fluid pressure chamber formed in the casing and having an inlet and an outlet with an annular valve seat surrounding the outlet, a power cylinder formed in the casing and opening into said fluid pressure chamber, a valve disc cooperating with the valve seat, a lever pivotally mounted in the fluid pressure chamber and carrying the valve disc for opening movement against the flow of fluid through the casing, a power piston in the power cylinder and pivotally connected to the lever, a spring in the power cylinder bearing against the power piston to yieldably hold the valve disc seated, a pilot line connecting the casing inlet with the power cylinder above the power piston, a pilot valve in the pilot line for effecting flow of fluid into the power cylinder or venting of fluid from the power cylinder, and means rendered operative by the movement of the power piston into the position it assumes when the valve is in its fully open position for preventing leakage of fluid from the fluid pressure chamber into the power cylinder above the power piston when the power cylinder is being vented.

2. A fluid pressure operated valve, comprising a casing, a fluid pressure chamber formed in the casing and having an inlet and an outlet with an annular valve seat surrounding the outlet, a power cylinder formed in the casing and opening into said fluid presure chamber, a power piston positioned in the power cylinder and adapted to partake of reciprocating and tilting motions, a bell crank lever pivoted at one end in the fluid pressure chamber, a valve disc for the valve seat carried by the free end of the bell crank lever, and means for connecting the power piston to the intermediate portion of the bell crank lever for pivotal movement only.

3. A fluid pressure operated valve, comprising a casing, a fluid pressure chamber formed in the casing and having an inlet and an outlet with an annular valve seat surrounding the outlet, a power cylinder formed in the casing and opening into said fluid pressure chamber, a power piston positioned in the power cylinder and adapted to partake of reciprocating and tilting motions, yieldable packing and bearing means carried by the power piston and engageable with the wall of the power cylinder, a bell crank lever pivoted at one end in the fluid pressure chamber, a valve disc for the valve seat carried by the free end of the bell crank lever, and means for connecting the power piston to the intermediate portion of the bell crank lever for pivotal movement only.

4. A fluid pressure operated valve, comprising a casing, a fluid pressure chamber formed in the casing and having an inlet and an outlet with an annular valve seat surrounding the outlet, a power cylinder formed in the casing and opening into said fluid pressure chamber, a power piston positioned in the power cylinder and adapted to partake of reciprocating and tilting motions, a bell crank lever pivoted at one end in the fluid pressure chamber, a valve disc for the valve seat carried by the free end of the bell crank lever, means for connecting the power piston to the intermediate portion of the bell crank lever for pivotal movement only, controllable means for creating either equalized fluid pressures in the fluid pressure chamber and the power cylinder or atmospheric pressure in the power cylinder to cause the valve disc to be seated or unseated, and means rendered operative by the movement of the power piston into the position it assumes when the valve disc is in its fully open position for preventing leakage of fluid from the fluid pressure chamber into the power cylinder above the power piston when the controllable means is operated to create atmospheric pressure in the power cylinder.

5. A fluid pressure operated valve, comprising a casing, a fluid pressure chamber formed in the casing and having an inlet and an outlet with an annular valve seat surrounding the outlet, a power cylinder formed in the casing and opening into said fluid pressure chamber, a power piston positioned in the power cylinder and adapted to partake of reciprocating and tilting motions, yieldable packing and bearing means carried by the power piston and engageable with the wall of the power cylinder, a bell crank lever pivoted at one end in the fluid pressure chamber, a valve disc for the valve seat carried by the free end of the bell crank lever, means for connecting the power piston to the intermediate portion of the bell crank lever for pivotal movement only, controllable means for creating either equalized fluid pressures in the fluid pressure chamber and the power cylinder or atmospheric pressure in the power cylinder to cause the valve disc to be seated or unseated, and means rendered operative by the movement of the power piston into the position it assumes when the valve disc is in its fully open position for preventing leakage of fluid from the fluid pressure chamber into the power cylinder above the power piston when the controllable means is operated to create atmospheric pressure in the power cylinder.

6. A fluid pressure operated valve, comprising a casing having an inlet normally free of fluid and an outlet, a chamber between the inlet and the outlet in which fluid pressure is developed when fluid is delivered to the casing inlet, a valve seat in the chamber surrounding the outlet, and a power cylinder opening into the fluid pressure chamber; a power piston mounted in the power cylinder with its inner and outer faces adapted to be exposed to the fluid pressures developed in the pressure chamber and the power cylinder respectively, a pilot line connecting the casing inlet with the power cylinder above the power piston, a pilot valve in the pilot line for effecting flow of fluid into the power cylinder or venting of fluid from the power cylinder, means for causing the fluid pressure developed in the pressure chamber to be applied to a portion of the area of the inner face of the power piston at a slower rate than fluid pressure is developed in the power cylinder through the pilot line and applied to the outer face of the power piston, a valve disc for the valve seat, and means for operatively connecting the valve disc to the power cylinder.

7. A fluid pressure operated valve, comprising a casing having an inlet normally free of fluid and an outlet, a chamber between the inlet and the outlet in which fluid pressure is developed when fluid is delivered to the casing inlet, a valve seat in the chamber surrounding the outlet, and a power cylinder opening into the fluid pressure chamber; a power piston mounted in the power cylinder with its inner and outer faces adapted to be exposed to the fluid pressures developed in the pressure chamber and the power cylinder respectively, a power piston loading spring positioned in the power cylinder, a pilot line connecting the casing inlet with the power cylinder above the power piston, a pilot valve in the pilot line for effecting flow of fluid into the power cylinder or venting of fluid from the power cylinder, means for causing the fluid pressure developed in the pressure chamber to be applied to a portion of the area of the inner face of the power piston at a slower rate than fluid pressure is developed in the power cylinder through the pilot line and applied to the outer face of the power piston, a valve disc for the valve seat, and means for operatively connecting the valve disc to the power piston.

8. A fluid pressure operated valve, comprising a casing having an inlet normally free of fluid and an outlet, a chamber between the inlet and the outlet in which fluid pressure is developed when fluid is delivered to the casing inlet, a valve seat in the chamber surrounding the outlet, and a power cylinder opening into the fluid pressure chamber; a power piston mounted in the power cylinder with its inner and outer faces adapted to be exposed to the fluid pressures developed in the pressure chamber and the power cylinder respectively, a pilot line connecting the casing inlet with the power cylinder above the power piston, a pilot valve in the pilot line for effecting flow of fluid into the power cylinder or venting of fluid from the power cylinder, means for causing the fluid pressure developed in the pressure chamber to be applied to a portion of the area of the inner face of the power piston at a slower rate than fluid pressure is developed in the power cylinder through the pilot line and applied to the outer face of the power piston, a valve disc for the valve seat, and a bell crank lever pivotally mounted in the fluid pressure chamber and operatively connecting the valve disc to the power piston.

9. A fluid pressure operated valve, comprising a casing having an inlet normally free of fluid and an outlet, a chamber between the inlet and the outlet in which fluid pressure is developed when fluid is delivered to the casing inlet, a valve seat in the chamber surrounding the outlet, and a power cylinder opening into the fluid pressure chamber; a power piston mounted in the power cylinder with its inner and outer faces adapted to be exposed to the fluid pressures developed in the pressure chamber and the power cylinder respectively, a pilot line connecting the casing inlet with the power cylinder above the power piston, a pilot valve in the pilot line for effecting flow of fluid into the power cylinder or venting of fluid from the power cylinder, means for causing the fluid pressure developed in the pressure chamber to be applied to a portion of the area of the inner face of the power piston at a slower rate than fluid pressure is developed in the power cylinder through the pilot line and applied to the outer face of the power piston, a valve disc for the valve seat, a bell crank lever pivotally mounted at one end in the fluid pressure chamber, means for pivotally carrying the valve disc on the free end of the bell crank lever, and means for pivotally connecting the intermediate portion of the bell crank lever to the power piston.

10. A fluid pressure operated valve, comprising a casing having an inlet normally free of fluid and an outlet, a chamber between the inlet and the outlet in which fluid pressure is developed when fluid is delivered to the casing inlet, a valve seat in the chamber surrounding the outlet, and a power cylinder opening into the fluid pressure chamber; a power piston mounted in the power cylinder with its inner and outer faces adapted to be exposed to the fluid pressures developed in the pressure chamber and the power cylinder respectively, a power piston loading spring positioned in the power cylinder, a pilot line connecting the casing inlet with the power cylinder above the power piston, a pilot valve in the pilot line for effecting flow of fluid into the power cylinder or venting of fluid from the power cylinder, means for causing the fluid pressure developed in the pressure chamber to be applied to a portion of the area of the inner face of the power piston at a slower rate than fluid pressure is developed in the power cylinder through the pilot line and applied to the outer face of the power piston, a valve disc for the valve seat, and a bell crank lever pivotally mounted in the fluid pressure chamber and operatively connecting the valve disc to the power piston.

11. A fluid pressure operated valve, comprising a casing having an inlet normally free of fluid and an outlet, a chamber between the inlet and the outlet in which fluid pressure is developed when fluid is delivered to the casing inlet, a valve seat in the chamber surrounding the outlet, and a power cylinder opening into the fluid pressure chamber; a power piston mounted in the power cylinder with its inner and outer faces adapted to be exposed to the fluid pressures developed in the pressure chamber and the power cylinder respectively, a power piston loading spring positioned in the power cylinder, a pilot line connecting the casing inlet with the power cylinder above the power piston, a pilot valve in the pilot line for effecting flow of fluid into the power cylinder or venting of fluid from the power cylinder, means for causing the fluid pressure developed in the pressure chamber to be applied to a portion of the area of the inner face of the power piston at a slower rate than fluid pressure is developed in the power cylinder through the pilot line and applied to the outer face of the power piston, a valve disc for the valve seat, a bell crank lever pivotally mounted at one end in the fluid pressure chamber, means for pivotally carrying the valve disc on the free end of the bell crank lever, and means for pivotally connecting the intermediate portion of the bell crank lever to the power piston.

12. A fluid pressure operated valve, comprising a casing having an inlet normally free of fluid and an outlet, a chamber between the inlet and the outlet in which fluid pressure is developed when fluid is delivered to the casing inlet, a valve seat in the chamber surrounding the outlet, a power cylinder above the fluid pressure chamber, and a barrier plate, having a central opening, interposed between the fluid pressure chamber and the power cylinder to restrict communication therebetween; a power piston mounted in the power cylinder with its outer face adapted to be exposed to the fluid pressure developed in the power cylinder, said power piston adapted to seat against the barrier plate so as to limit the application of fluid pressure as it is developed in the fluid pressure chamber to the area of the inner face of the power piston exposed by the central opening of the barrier plate, means for causing the fluid pressure developed in the pressure chamber to be applied to the remaining portion of the area of the inner face of the power piston at a slower rate than the fluid pressure is developed in the power cylinder through the pilot line and applied to the outer face of the power piston, a pilot line connecting the casing inlet with the power cylinder above the power piston, a pilot valve in the pilot line for effecting flow of fluid into the power cylinder or venting of fluid from the power cylinder, a valve disc for the valve seat, and means for operatively connecting the valve disc to the power piston.

13. A fluid pressure operated valve, comprising a casing having an inlet normally free of fluid and an outlet, a chamber between the inlet and the outlet in which fluid pressure is developed when fluid is delivered to the casing inlet, a valve seat in the chamber surrounding the outlet, and a power cylinder opening into the fluid pressure chamber; a power piston positioned in the power cylinder and adapted to partake of reciprocating and tilting motions, the inner and outer faces of the power piston being adapted to be exposed to the fluid pressures developed in the pressure chamber and power cylinder respectively, a pilot line connecting the casing inlet with the power cylinder above the power piston, a pilot valve in the pilot line for effecting flow of fluid into the power cylinder or venting of fluid from the power cylinder, means for causing the fluid pressure developed in the pressure chamber to be applied to a portion of the area of the inner face of the power piston at a slower rate than fluid pressure is developed in the power cylinder through the pilot line and applied to the outer face of the power piston, a valve disc for the valve seat, a bell crank lever pivoted at one end in the fluid pressure chamber, means for pivotally connecting the valve disc to the free end of the bell crank lever, and means for connecting the power piston to the intermediate portion of the bell crank lever for pivotal movement only.

14. A fluid pressure operated valve, comprising a casing having an inlet and an outlet of equal diameters, a fluid pressure chamber between and of greater cross sectional area than the diameter of the outlet, and an annular valve seat surrounding and arranged in a plane that is normal to the axis of the outlet, said casing outlet and valve seat being detachably connected to the casing, said inlet, outlet, pressure chamber and valve seat all being arranged in axial alignment with each other to provide a straight flow path for fluid through the casing and being of such relative dimensions as to produce very little pressure drop through the valve casing, a power cylinder formed in the casing with its axis paralleling the plane of the valve seat and opening into the fluid pressure chamber, a valve disc for the valve seat, a bell crank lever pivoted at one end so as to swing into and out of the power cylinder, a pin for pivotally connecting the valve disc to the free end of the bell crank lever so that the valve disc will be moved out of the flow path between the aligned inlet and outlet when the lever swings into the power cylinder, means for limiting pivotal movement of the valve disc relative to said lever, and a power piston positioned in the power cylinder and pivotally connected to the intermediate portion of the bell crank lever.

15. A fluid pressure operated valve, comprising a casing having an inlet and an outlet of equal diameters, a fluid pressure chamber between and of greater cross sectional area than the diameter of the outlet, and an annular valve seat surrounding and arranged in a plane that is normal to the axis of the outlet, said casing outlet and valve seat being detachably connected to the casing, said inlet, outlet, pressure chamber and valve seat all being arranged in axial alignment with each other to provide a straight flow path for fluid through the casing and being of such relative dimensions as to produce very little pressure drop through the valve casing, a power cylinder formed in the casing and opening into the fluid pressure chamber, a valve disc for the valve seat, a bell crank lever pivoted at one end so as to swing into and out of the power cylinder, a pin for pivotally connecting the valve disc to the free end of the bell crank lever so that the valve disc will be moved out of the flow path between the aligned inlet and outlet when the lever swings into the power cylinder, a power piston positioned in the power cylinder and pivotally connected to the intermediate portion of the bell crank lever, said power piston being in a state of equilibrium when equal fluid pressures only are applied to its opposite faces, and a spring in the power cylinder bearing against the power piston to yieldingly hold the valve disc seated.

16. A fluid pressure operated valve, comprising a casing having an inlet and an outlet of equal diameters, a fluid pressure chamber between and of greater cross sectional area than the diameter of the outlet, and an annular valve seat surrounding the outlet, said casing outlet and valve seat being detachably connected to the casing, said inlet, outlet, pressure chamber and valve seat all being arranged in axial alignment with each other to provide a straight flow path for fluid through the casing and being of such relative dimensions as to produce very little pressure drop through the valve casing, a power cylinder formed in the casing and opening into the fluid pressure chamber, a valve disc for the valve seat, a bell crank lever pivoted at one end so as to swing into and out of the power cylinder, means for pivotally connecting the valve disc to the free end of the bell crank lever so that the valve disc will be moved out of the flow path between the aligned inlet and outlet when the lever swings into the power cylinder, a single power piston positioned in the power cylinder to be subjected on its opposite faces to the fluid pressures existing in the fluid pressure chamber and the power cylinder and pivotally connected to the intermediate portion of the bell crank lever, and controllable means for selectively creating equalized fluid pressures in the fluid pressure chamber and the power cylinder or atmospheric pressure in the power cylinder to cause the valve disc to be seated or unseated, respectively.

HILDING V. WILLIAMSON.

REFERENCES CITED

The following references are of record in the file of this patent:

UNITED STATES PATENTS

| Number | Name | Date |
|---|---|---|
| 430,301 | Schenck | June 17, 1890 |
| 493,774 | Howes | Mar. 21, 1893 |
| 780,754 | Jungren | Jan. 24, 1905 |
| 822,887 | Emmet | June 5, 1906 |
| 960,602 | Turnbull | June 7, 1910 |
| 1,479,947 | Way | Jan. 8, 1924 |
| 1,526,812 | Thomas | Feb. 17, 1925 |
| 1,566,814 | Bliss | Dec. 22, 1925 |
| 1,905,625 | Fagan | Apr. 22, 1933 |
| 2,110,702 | Farmer | Mar. 8, 1938 |
| 2,159,686 | Campbell | May 23, 1939 |
| 2,373,654 | Beekly | Apr. 17, 1945 |

FOREIGN PATENTS

| Number | Country | Date |
|---|---|---|
| 486,973 | France | Feb. 28, 1918 |
| 609,081 | France | May 3, 1926 |
| 642,588 | France | May 6, 1928 |
| 157,429 | Germany | Dec. 23, 1904 |
| 180,410 | Germany | Jan. 22, 1907 |
| 1,257 | Great Britain | Mar. 15, 1882 |
| 1,816 | Great Britain | Jan. 26, 1899 |
| 4,651 | Great Britain | Sept. 29, 1883 |